United States Patent
Miyamoto et al.

(10) Patent No.: US 9,919,365 B2
(45) Date of Patent: Mar. 20, 2018

(54) SIDE MILLING CUTTER FOR SLOT CUTTING

(71) Applicants: Mitsubishi Hitachi Power Systems, Ltd., Yokohama, Kanagawa (JP); Sumitomo Electric Hardmetal Corp., Itami-shi, Hyogo (JP)

(72) Inventors: Takayuki Miyamoto, Yokohama (JP); Kenji Nishikawa, Tokyo (JP); Ippei Kono, Tokyo (JP); Junichi Hirai, Tokyo (JP); Masanori Kawakami, Yokohama (JP); Nobuhisa Kanamaru, Yokohama (JP); Hitoshi Tohkairin, Itami (JP)

(73) Assignees: Misubishi Hitachi Power Systems, Ltd., Yokohama (JP); Sumitomo Electric Hardmetal Corp., Itami-shi (JP)

( * ) Notice: Subject to any disclaimer, the term of this patent is extended or adjusted under 35 U.S.C. 154(b) by 209 days.

(21) Appl. No.: 14/574,835

(22) Filed: Dec. 18, 2014

(65) Prior Publication Data
US 2015/0165531 A1 Jun. 18, 2015

(30) Foreign Application Priority Data
Dec. 18, 2013 (JP) .................. 2013-261149

(51) Int. Cl.
*B23C 5/08* (2006.01)
*B23C 5/00* (2006.01)

(52) U.S. Cl.
CPC .............. *B23C 5/003* (2013.01); *B23C 5/006* (2013.01); *B23C 5/08* (2013.01); *B23C 2250/16* (2013.01);
(Continued)

(58) Field of Classification Search
CPC .......... B23C 5/003; B23C 5/006; B23C 5/08; B23C 2210/02; B23C 2260/04; B23C 2250/16
See application file for complete search history.

(56) References Cited

U.S. PATENT DOCUMENTS

| 3,690,414 A | 9/1972 | Aggarwal et al. |
| 7,661,912 B2 | 2/2010 | Onozuka et al. |

(Continued)

FOREIGN PATENT DOCUMENTS

| DE | 19963328 A1 * | 7/2000 | ............. B23C 5/006 |
| JP | 55-2523 | 1/1980 | |

(Continued)

OTHER PUBLICATIONS

Japanese-language Office Action issued in counterpart Japanese Application No. 2013-261149 dated May 9, 2017 with English translation (5 pages).

*Primary Examiner* — Alan Snyder
(74) *Attorney, Agent, or Firm* — Crowell & Moring LLP

(57) ABSTRACT

A side milling cutter for slot cutting is provided whose vibration can be damped even in cases where a vibration mode of the cutter generates plural nodes in a cutting part. A side milling cutter for slot cutting of the present invention includes a disc-shaped cutter and a plurality of cartridges as cutting edges provided at a predefined interval in a circumferential direction along an outer circumference of the disc-shaped cutter. The disc-shaped cutter cuts a predefined slot on a workpiece using the cartridges by circumferentially rotating. The disc-shaped cutter internally includes a plurality of vibration damping structures in the circumferential direction on a disk surface of the disc-shaped cutter.

7 Claims, 7 Drawing Sheets

(52) U.S. Cl.
CPC ..... *B23C 2260/04* (2013.01); *Y10T 407/1942* (2015.01)

(56) References Cited

U.S. PATENT DOCUMENTS

2006/0275090 A1* 12/2006 Onozuka ............... B23B 29/022
 408/143
2011/0150585 A1  6/2011 Hakamada
2011/0229278 A1  9/2011 Sjoo

FOREIGN PATENT DOCUMENTS

| | | |
|---|---|---|
| JP | 2001-328022 A | 11/2001 |
| JP | 2006-305674 A | 11/2006 |
| JP | 2011-194564 A | 10/2011 |
| JP | 2012-196729 A | 10/2012 |
| WO | WO 2010/027043 A1 | 3/2010 |

* cited by examiner

SIDE MILLING CUTTER FOR SLOT CUTTING

CLAIM OF PRIORITY

The present application claims priority from Japanese Patent Application JP 2013-261149 filed on Dec. 18, 2013, the content of which is hereby incorporated by reference into this application.

FIELD OF THE INVENTION

The present invention relates to a side milling cutter for slot cutting, more particularly, to a side milling cutter for slot cutting with vibration damping structures.

BACKGROUND OF THE INVENTION

Disc-shaped tools called disc milling cutters are generally used for slot cutting.

FIG. 1 shows an example of the disc milling cutters. The disc milling cutter 1 with a diameter D includes cartridges 2 used as cutting edges along the outer circumference of the disc milling cutter 1. The disc milling cutter 1 cuts a desired slot 4 on a workpiece 3 by circumferentially rotating. If the diameter D of the disc milling cutter 1 is larger, the vibration of the disc milling cutter 1 during slot cutting is larger. This possibly leads to a breakage of the cutting parts and a deterioration of accuracy of slot cutting.

FIGS. 2 and 3 show examples of one of the vibration modes of the disc milling cutter 1 during slot cutting. FIGS. 2 and 3 show results of mode analysis on a disc milling cutter 1 with a diameter D of 1200 mm by the finite element method. In the analysis, the disc milling cutter 1 was fixed to a shaft 5. As shown in FIGS. 2 and 3, the vibration modes of the disc milling cutter 1 cause an outer peripheral portion of the disc milling cutter 1 to undulate in the z-axis direction (along the shaft 5). For example, in a vibration mode at a frequency of 267 Hz (FIG. 2) where the vibration amplitude in the z-axis direction is maximized, four nodes are generated along the outer circumference of the disc milling cutter 1. In a vibration mode at a frequency of 374 Hz (FIG. 3), six nodes are generated along the outer circumference of the disc milling cutter 1.

Thus, it is known that the dominant vibration of the disc milling cutter 1 is in a mode in which an outer circumference of the disc milling cutter 1 undulates in the z-axis direction.

Examples of existing techniques for cutting workpiece using disc-shaped tools are disclosed in JP 2011-194564 and JP 2012-196729.

JP 2011-194564 discloses a face milling cutter for rotary cutting which includes a rotation axis and a cutter body. The cutter body includes, in an end portion thereof, plural insert seats on which rotary cutting inserts are placed. The face milling cutter is positioned on the inside of the cutter body and includes plural damping elements for damping vibration of the face milling cutter. The damping elements extend in parallel with the rotation axis to be adjacent to one end of the cutter body while radially shifted away from the rotation axis.

JP 2012-196729 discloses a rotary cutting tool which has cutting edges attached to a disc-like cutter body. An annular groove is formed on a surface of the cutter body. A ring-shaped weight is placed in the groove via viscoelastic bodies such that the weight can move relative to the cutter body in the axial direction of the cutter body.

In the face milling cutter disclosed in JP 2011-194564, the vibration of the face milling cutter is damped by the plural damping elements included in the cutter body. However, JP 2011-194564 fails to disclose details of the structure of the damping elements. If a vibration mode to be damped differs from the vibration mode of the face milling cutter in JP 2011-194564, the face milling cutter may vibrate in a direction in which the damping elements are not effective, that is, the vibration of the face milling cutter cannot be damped. Therefore, the technique disclosed in JP 2011-194564 cannot be used as it is.

In JP 2012-196729, a vibration damping structure and a rotary cutting tool are disclosed. The vibration damping structure is intended for a vibration mode occurring when cutting force is generated in diametrical and rotation-axis directions of the tool. However, the vibration damping structure disclosed in JP 2012-196729 is effective only for vibration modes in which the tool displacement by vibration occurs only in one cutting part and in which the tool vibrates in a direction of deflection with respect to she rotation axis of the tool. Therefore, the technique disclosed in JP 2012-196729 cannot be applied to vibration modes of disc-shaped tools in which plural nodes are generated in cutting parts.

The present invention has been made in view of the above problems. An object of the present invention is to provide a side milling cutter for slot cutting whose vibration can be damped even in cases where a vibration mode of the cutter generates plural nodes in a cutting part.

SUMMARY OF THE INVENTION

To achieve the above object, a side milling cutter for slot cutting of the present invention comprises a disc-shaped cutter; and a plurality of cartridges as cutting edges provided at a predefined interval in a circumferential direction along an outer circumference of the disc-shaped cutter. The disc-shaped cutter cuts a predefined slot on a workpiece using the cartridges by circumferentially rotating. The disc-shaped cutter internally includes a plurality of vibration damping structures in the circumferential direction on a disk surface of the disc-shaped cutter.

According to the present invention, a side milling cutter for slot cutting can be provided whose vibration can be damped even in cases where a vibration mode of the cutter generates plural nodes in a cutting part.

DETAILED DESCRIPTION OF THE PREFERRED EMBODIMENTS

Figure 1:
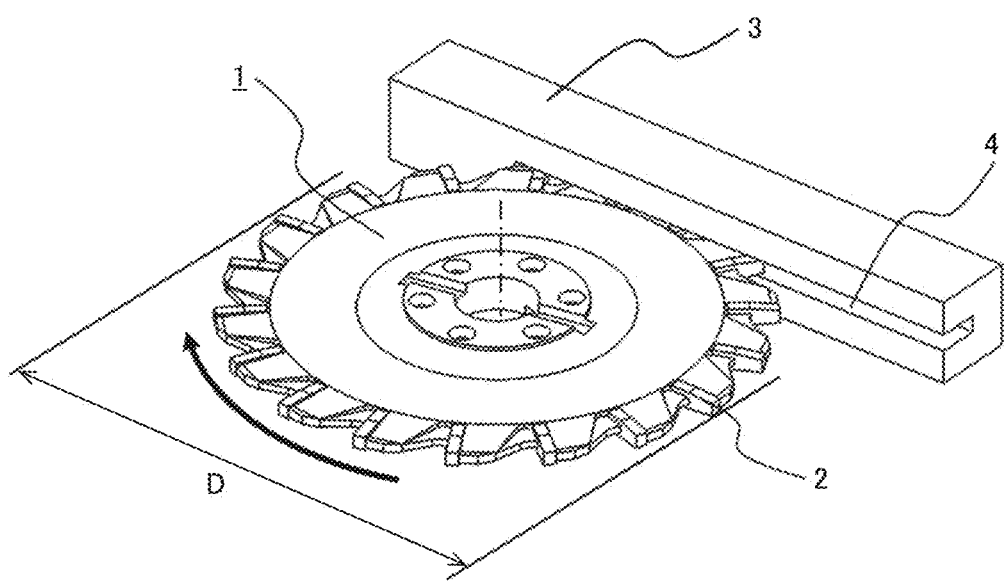
FIG. 1 is a perspective view showing a general example of a disc-shaped tool cutting a slot on a workpiece.

A side milling cutter for slot cutting according to embodiments of the present invention will be described with reference to figures. In the following description, identical elements in different embodiments will be denoted by identical reference characters.

First Embodiment

Figure 4:
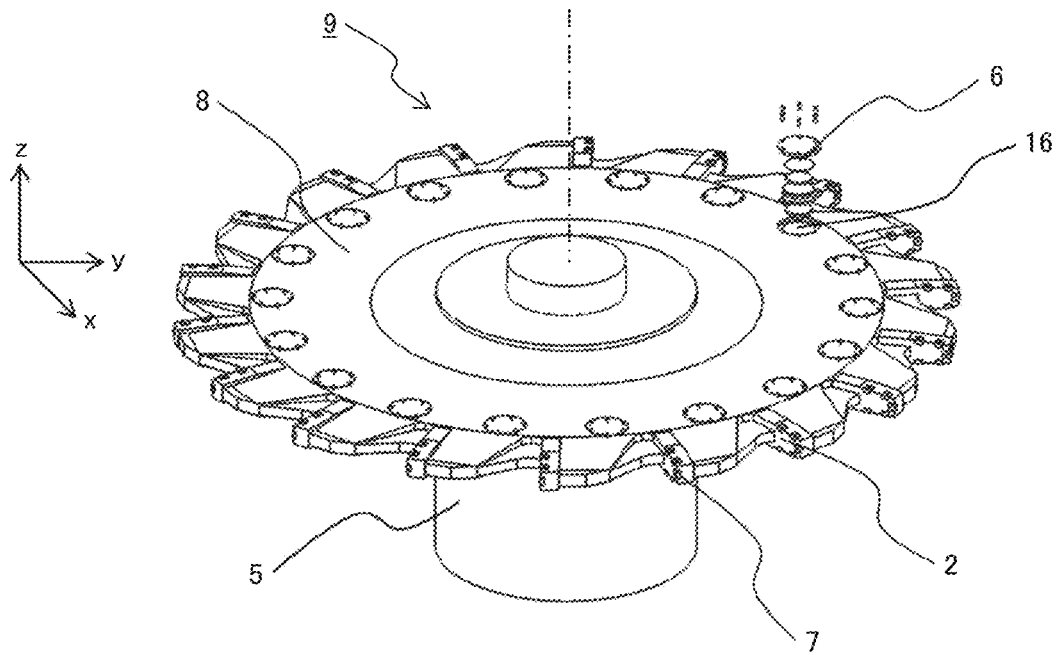
FIG. 4 is a perspective view of a disc milling cutter having vibration damping structures of a side milling cutter for slot cutting according to a first embodiment of the present invention.

FIG. 4 shows a disc milling cutter 9 having vibration damping structures 6 of a side milling cutter for slot cutting according to a first embodiment of the present invention. The disc milling cutter 9 is assumed to have a diameter of 1200 mm.

As shown in FIG. 4, the disc milling cutter 9 having vibration damping structures 6 of the present embodiment mainly includes a disc-shaped cutter body 8, plural cartridges 2 which are used as cutting edges and are positioned at a predefined interval in the circumferential direction along the outer circumference of the cutter body 8, inserts 7 attached to the cartridges 2, a shaft 5 which rotates the cutter body 8 by rotating with the cutter body 8, and the vibration damping structures 6 internally included on the outer circumference side in the cutter body 8. Preferably, the cutter body 8 internally includes the plural vibration damping structures 6 on a disk surface of the cutter body 8.

As described above with reference to FIGS. 2 and 3, a conventional disc milling cutter 1 has a vibration mode in which not all the cutting parts vibrate in the same direction and in which an outer peripheral portion of the disc milling cutter 1 vibrates undulating in the z-axis direction. It is, therefore, necessary that the vibration damping structures 6 damp vibrations of individual cutting parts in accordance with their respective phases. Such cutting part vibrations can be effectively damped, for example, by circumferentially positioning as many vibration damping structures 6 as the number of cutting parts of the disc milling cutter 9 on the disc surface of the disc milling cutter 9 at an equal pitch along the circumference of the disc milling cutter 9 as shown in FIG. 4 in the present embodiment.

Figure 5:
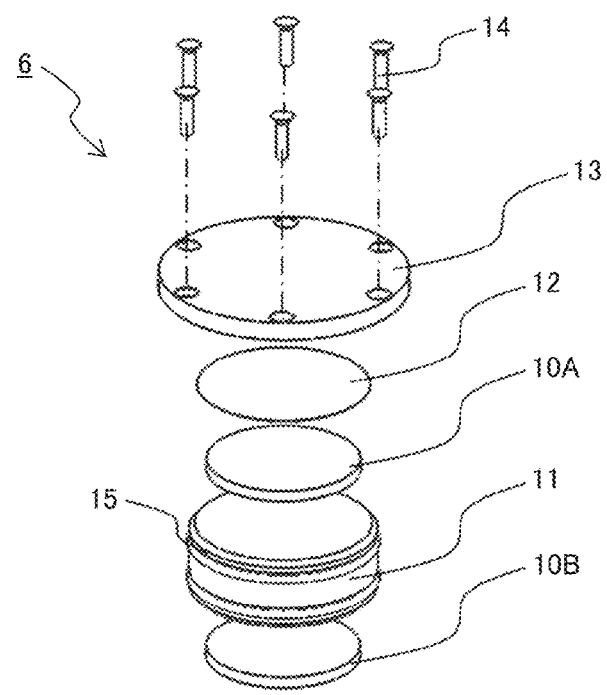
FIG. 5 is an exploded perspective view showing an example configuration of each of the vibration damping structures included in the disc milling cutter in FIG. 4.

FIG. 5 shows an example configuration of each of the vibration damping structures 6 included in the disc milling cutter 9 of the present embodiment.

As shown in FIG. 5, each of the vibration damping structures 6 in the present embodiment includes a weight 11, disc-shaped viscoelastic bodies 10A and 10B for damping the vibration of the disc milling cutter 9, the viscoelastic bodies 10A and 10B disposed on both surfaces of the weight 11, an adjusting shim 12 for adjusting the pressure applied to the viscoelastic body 10A, the shim 12 disposed on one surface of the viscoelastic body 10A, a cover 13 to hold the adjusting shim 12, viscoelastic bodies 10A and 10B, and weight 11 in the cutter body 8, and a ring-shaped viscoelastic body 15. The weight 11, the viscoelastic bodies 10A and 10B, the ring-shaped viscoelastic body 15, the adjusting shim 12, and the cover 13 included in each of the vibration damping structures 6 are placed in one of vibration damper holes 16 formed on the outer circumference side of the cutter body 8, as shown in FIG. 4.

The vibration damping structures 6 need to be disposed inside the disc milling cutter 9 to avoid interference with a workpiece 3. In addition, each of the vibration damping structures 6 may be tightly covered with the cover 13 to prevent degradation of the viscoelastic bodies 10A and 10B and deterioration of their vibration damping performance caused when the vibration damping structures 6 catch cutting chips or are exposed to cutting oil.

The cover 13 to be attached to the cutter body 8 that rotates at high speed is strongly tightened, for example, with screws 14 to prevent the cover 13 from falling while the disc milling cutter 9 is in operation. Preferably, to avoid the cover 13 loosening or coming off by the vibration of the weight 11, the cover 13 may be evenly fastened using six machine screws 14. Preferably, to prevent interference between the screws 14 and the workpiece 3 during cutting, the screw holes formed in the cover 13 to have the screws 14 therein are deeply counterbored and flat head machine screws are used as the screws 14. A thread locking adhesive may be applied to the screws 14 to prevent them from loosening.

Figure 6:
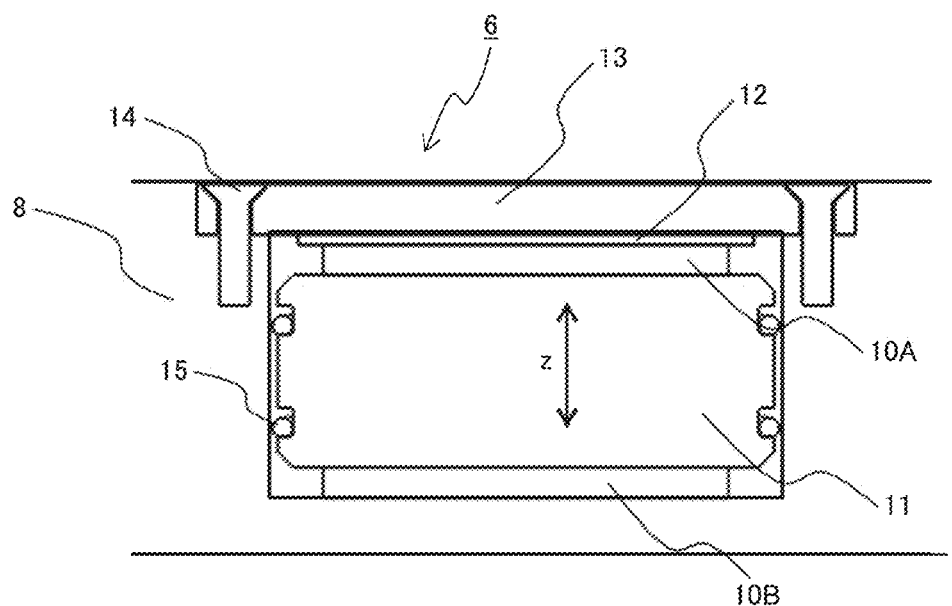
FIG. 6 is a sectional view of each of the vibration damping structures included in the disc milling cutter in FIG. 4.

FIG. 6 is a sectional view of each of the vibration damping structures 6 used in the disc milling cutter 9 with vibration damping structures of the present embodiment.

As shown in FIG. 6, the weight 11 is sandwiched by the viscoelastic bodies 10A and 10B in the z-axis direction in each of the vibration damping structures 6. When the cutter body 8 vibrates, the weight 11 vibrates in the z-axis direction in opposite phase to the cutter body 8. This action damps the vibration of the disc milling cutter 9 in its vibration mode.

The adjusting shim 12 is placed between the viscoelastic body 10A and the cover 13. When the cover 13 is fixed to the cutter body 8, the adjusting shim 12 deforms and compresses the viscoelastic body 10A.

This configuration causes the viscoelastic bodies 10A and 10B sandwiching the weight 11 to be appropriately pressed. For example, when the weight 11 moves downward in the z-axis direction, the lower viscoelastic body 10B is compressed by the weight 11 and shortened, whereas the upper viscoelastic body 10A is released from the pressure and expands. Thus, with the viscoelastic bodies 10A and 10B subjected to a pressure beforehand by the adjusting shim 12, the contact between the weight 11 and the viscoelastic bodies 10A and 10B is maintained.

The damping characteristics of the viscoelastic bodies 10A and 10B corresponding to the frequency of vibration to be damped can be adjusted by changing the thickness of the adjusting; shim 12 or by changing the number of adjusting shims 12 to be used.

In the disc milling cutter 9 with the vibration damping structures 6 shown in FIG. 4, the vibration damping structures 6 are arranged around the rotation axis of the disc milling cutter 9 and along the outer circumference of the cutter body 8. Therefore, the centrifugal force applied to the vibration damping structures 6 cannot be ignored when the disc milling cutter 9 rotates at high speed.

When subjected to the centrifugal force, the side surface of the weight 11 included in each of the vibration damping structures 6 is pressed against the cutter body 8, i.e. interference occurs between the weight 11 and the cutter body 8. This interference possibly prevents the vibration damping structures 6 from damping the vibration of she disc milling cutter 9.

To avoid this interference between the weight 11 and the cutter body 8, the weight 11 may have at least one groove on the side surface thereof, and at least one ring-shaped viscoelastic body 15, such as O-ring, may be placed in the groove. Preferably, at least two ring-shaped viscoelastic bodies 15 are placed on the side surface of the weight 11 to allow the weight 11 to evenly contact the cutter body 8 via the ring-shaped viscoelastic bodies 15.

Figure 7:
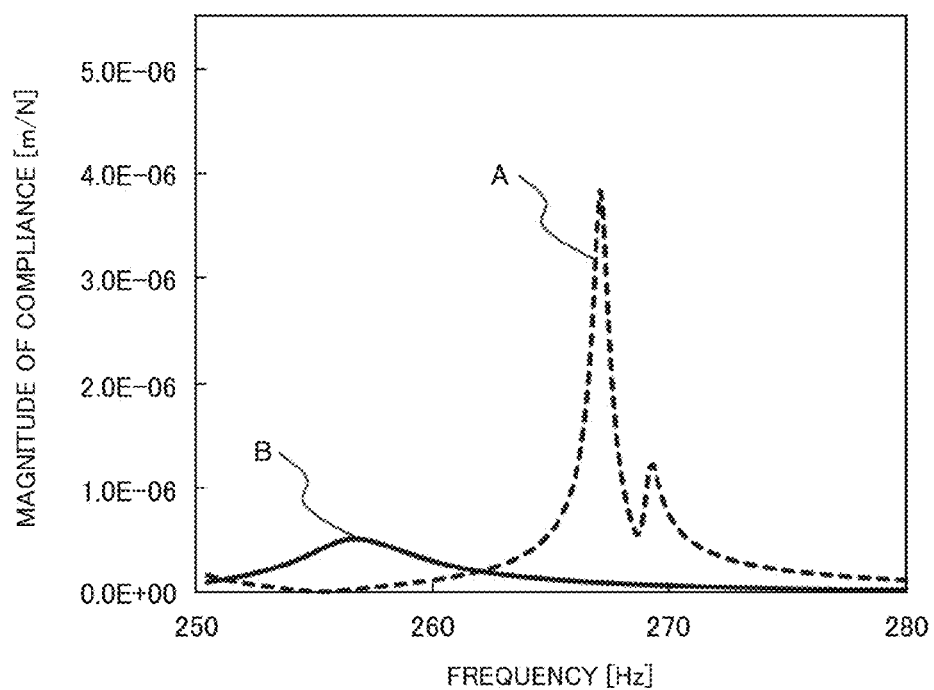
FIG. 7 is a characteristic diagram comparing the magnitude of compliance in the z-axis direction of a disc milling cutter having vibration damping structures in the first embodiment and that of a disc milling cutter having no vibration damping structures.

FIG. 7 is a characteristic diagram showing the magnitude of compliance in the z-axis direction of the disc milling cutter 9 having the vibration damping structures 6 according to the present embodiment. FIG. 7 shows a calculation result of the magnitude of compliance for a disc milling cutter 9 with a diameter of 1200 mm having the vibration damping structures 6, each of which includes a weight 11 with a mass of 100 g.

As shown in FIG. 7, in the case of a conventional disc milling cutter (represented by broken-line curve A) without the vibration damping structures 6, the maximum magnitude of compliance is $3.83 \times 10^{-6}$ m/N at natural frequency 267 Hz.

In the case of the disc milling cutter with the vibration damping structures 6 of the present embodiment (represented by solid-line curve B), the maximum magnitude of compliance is $5.21 \times 10^{-7}$ m/N. Thus, the dynamic rigidity of the disc milling cutter 9 of the present embodiment is about 86% higher than that of the conventional disc milling cutter. As a result, the disc milling cutter 9 of the present embodiment can improve machining accuracy.

To further increase the damping effect, the weight 11 may be increased in mass. For example, when the weight 11 with diameter of 45 mm and thickness of 20 mm is made of ferrous metal SS400, the mass of the weight 11 is about 260 g. When the weight 11 of the same size is made of tungsten alloy, which has a density about two times greater than the ferrous metal has, to increase the damping effect, the mass of the weight 11 is about 590 g to be able to further improve the damping effect.

According to the configuration of the present embodiment, the vibration of the disc milling cutter 9 in a disc shape can be effectively damped even in a vibration mode in which plural nodes are generated.

Second Embodiment

Figure 8:
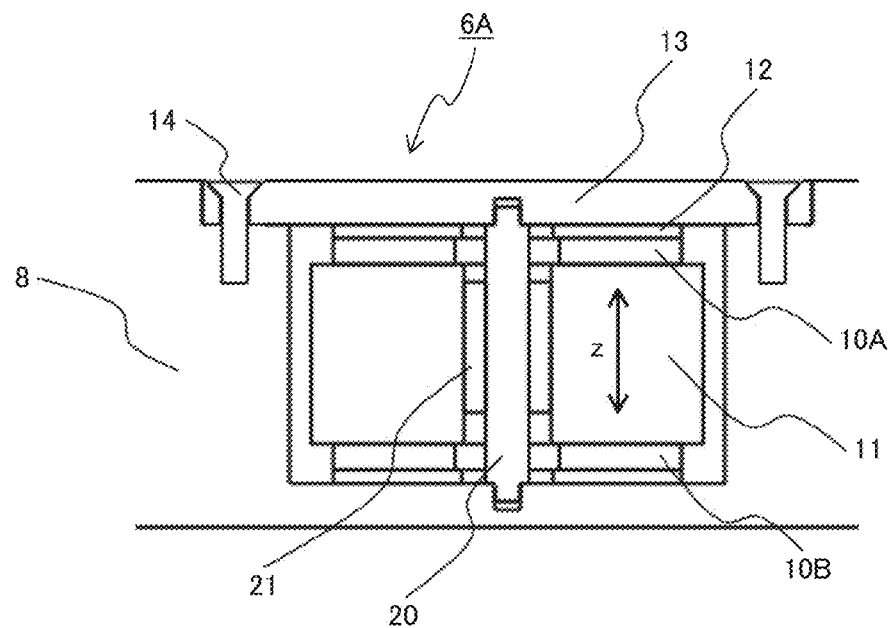
FIG. 8 is a sectional view of each of the vibration damping structures included in the disc milling cutter having vibration damping structures of a side milling cutter for slot cutting according to a second embodiment of the present invention.

FIG. 8 is a sectional view of each of the vibration damping structures 6A included in the disc milling cutter 9 having the vibration damping structures according to a second embodiment of the present invention.

The vibration damping structures of the present invention are not required to have a configuration exactly same as that in the first embodiment. Compared with the vibration damping structures 6 of the first embodiment, each of the vibration damping structures 6A of the second embodiment shown in FIG. 8 is improved by additionally including a rod 20 and a linear bushing 21.

In each of the vibration damping structures 6A of the present embodiment shown in FIG. 8, the rod 20 and the linear bushing 21 are provided to extend through a through-hole formed at the center of the weight 11. The weight 11 is sandwiched between the viscoelastic bodies 10A and 10B in the z-axis direction. The adjusting shim 12 is disposed between the viscoelastic body 10A and the cover 13. The rod 21 is fixed to the cutter body 8 and the cover 13. In the other respects, the vibration damping structures 6A are configured identically to the vibration damping structures 6 of the first embodiment.

The configuration according to the present embodiment described above can achieve advantageous effects similar to those of the first embodiment. Furthermore, with the rod 20 and the linear bushing 21, interference between the weight 11 and the cutter body 8 caused by centrifugal force can be prevented, so that the weight 11 can smoothly move in the z-axis direction.

In cases where the rod 20 and the weight 11 can smoothly move in the z-axis direction, the linear bushing 21 is dispensable.

Third Embodiment

Figure 9:
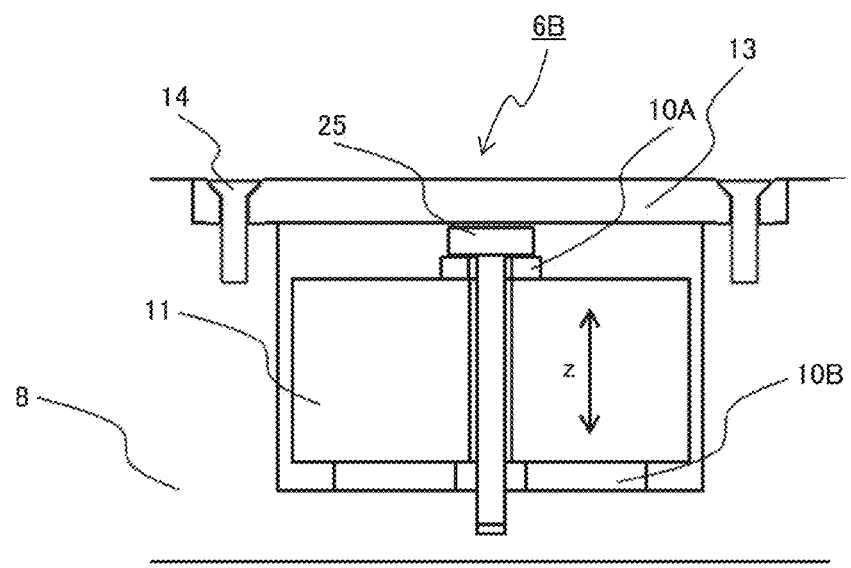
FIG. 9 is a sectional view of each of the vibration damping structures included in the disc milling cutter having vibration damping structures of a side milling cutter for slot cutting according to a third embodiment of the present invention.

FIG. 9 is a sectional view of each of the vibration damping structures 6B included in the disc milling cutter 9 having the vibration damping structures according to a third embodiment of the present invention.

In each of the vibration damping structures 6B in the present embodiment, vibration damping is adjusted by clamping of a bolt 25.

As shown in FIG. 9, each of the vibration damping structures 6B in the present embodiment includes the bolt 25, the viscoelastic bodies 10A and 10B, the weight 11, the cover 13, and the screws 14 placed inside the cutter body 8. The weight 11 and the viscoelastic bodies 10A and 10B have a through-hole formed at the center of the weight 11 and the viscoelastic bodies 10A and 10B. The through-hole has a diameter slightly larger than the diameter of the bolt 25. The bolt 25 is screwed to the cutter body 8 through the through-holes. By clamping of the bolt 25, the viscoelastic bodies 10A and 10B are subjected to a pressure beforehand and, as a result, damp the vibration of the disc milling cutter 9. The viscoelastic body 10A, which is placed above the weight 11, is sandwiched between the head of the bolt 25 and the weight 11. In a case when the contact area is widened between the viscoelastic body 10A and the head of the bolt 25 and the pressure generated by clamping the bolt 25 is more evenly distributed to the viscoelastic bodies 10A and 10B, a washer or a shim ring may be disposed between the head of the bolt 25 and the viscoelastic body 10A.

The through-hole, which is formed at the center of the weight 11 and through which the bolt 25 is inserted, preferably has slightly larger diameter than the bolt 25 has to allow the weight 11 to smoothly move in the z-axis direction without interference of the bolt 25. A linear bushing may be placed between the weight 11 and the bolt 25 to reduce the friction resistance between the weight 11 and the bolt 25 as much as possible for the weight 11 to smoothly move in the z-axis direction even under the influence of centrifugal force.

The configuration according to the present embodiment described above can achieve advantageous effects similar to those of the second embodiment.

In the present embodiment, the means of clamping is not necessarily the bolt 25 as long as the viscoelastic bodies 10A and 10B in and weight 11 can be clamped with an appropriate pressure. For example, different types of screw may be used as the means of clamping instead of the bolt 25.

Fourth Embodiment

Figure 10:
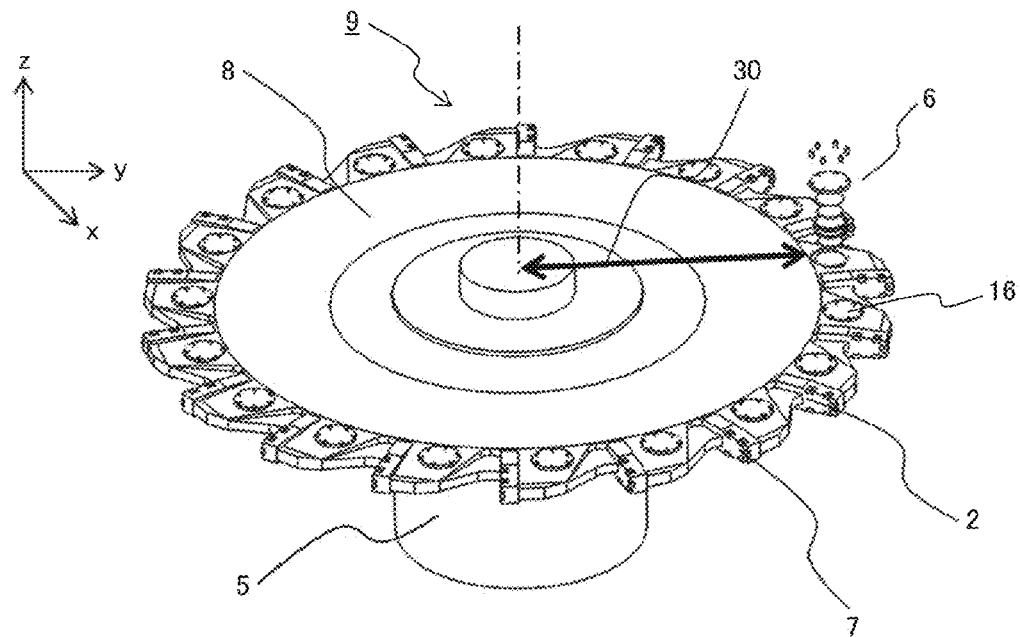
FIG. 10 is a perspective view of a disc milling cutter having the vibration damping structures in the first embodiment, the vibration damping structures positioned close to the edges of the cutting parts of the disc milling cutter.
Figure 11:
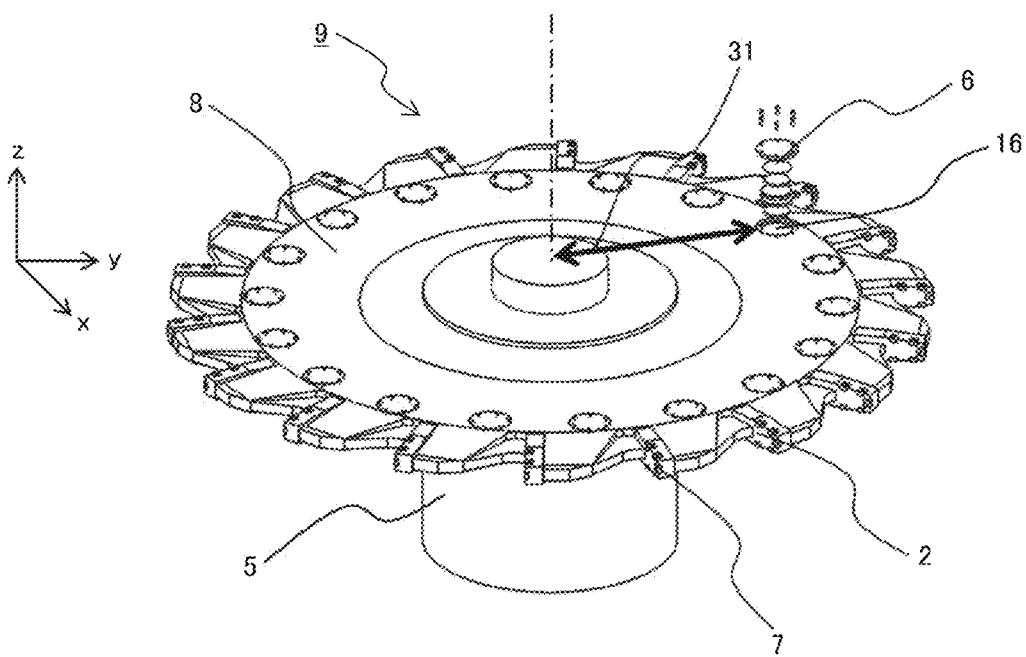
FIG. 11 is a perspective view of a disc milling cutter having the vibration damping structures in the first embodiment, the vibration damping structures positioned inwardly toward the rotation axis of the disc milling cutter from the cutting parts of the disc milling cutter.
Figure 12:
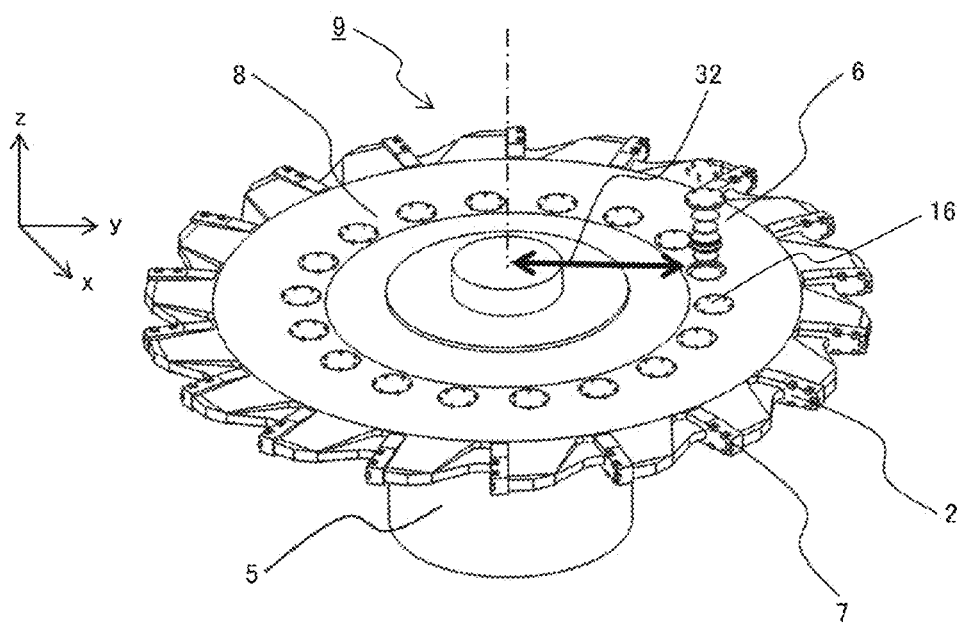
FIG. 12 is a perspective view of a disc milling cutter having the vibration damping structures in the first embodiment, the vibration damping structures positioned more inwardly toward the rotation axis of the disc milling cutter than the vibration damping structures shown in FIG. 11.

With reference to FIGS. 10 to 12, examples of positions of the vibration damping structures 6 in the disc milling cutters 9 according to the first embodiment will be described for a fourth embodiment of the present invention. FIGS. 10 to 12 show examples of the disc milling cutter 9 including the vibration damping structures 6 positioned differently from the vibration damping structures 6 in the first embodiment.

As shown in FIGS. 10 to 12, the positions of the vibration damping structures 6 are denoted by reference characters 30, 31, and 32, respectively, which indicate the distances from the rotation axis of the disc milling cutter 9 to the vibration damping structures 6. The vibration damping structures 6 are disposed in the circumferential direction of the disc milling cutter 9 on the disk surface of the cutter body 8. The vibration damping structures 6 are highly effective when they are positioned where the amplitude of vibration of the disc milling cutter 9 is largest.

Figure 2:
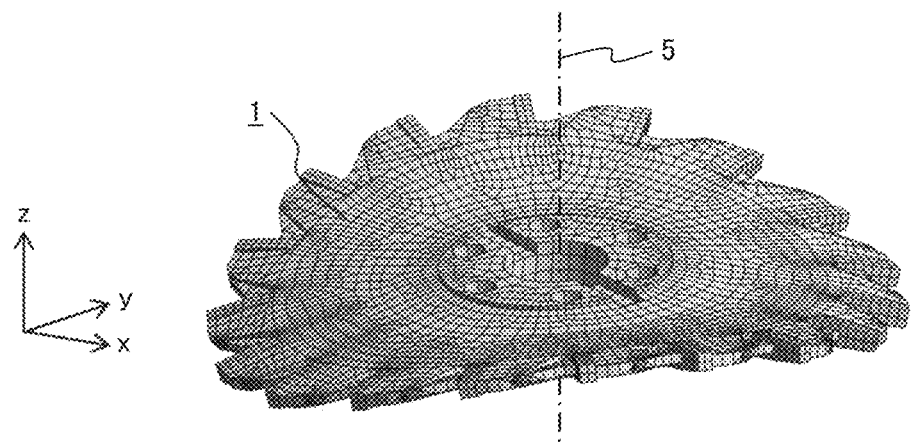
FIG. 2 shows an example of a vibration mode of a disc milling cutter in which four nodes are generated in an outer circumference of the disc milling cutter.
Figure 3:
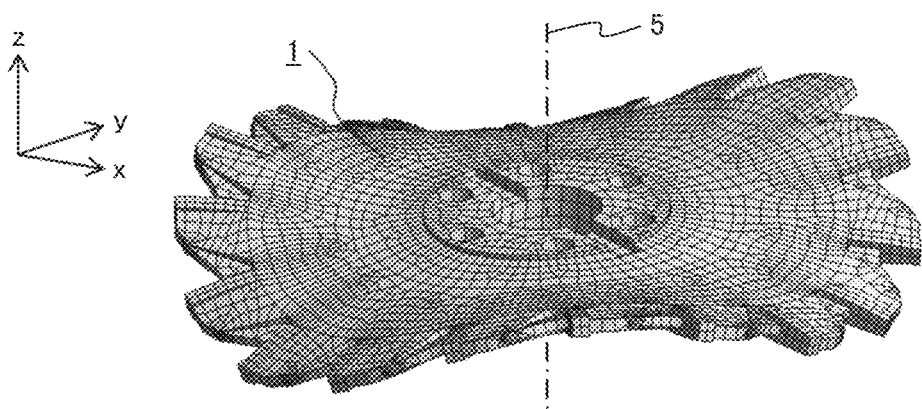
FIG. 3 shows an example of a vibration mode of a disc milling cutter in which six nodes are generated in an outer circumference of the disc milling cutter.

In the disc milling cutter 9 of the present embodiment, the vibration amplitude is largest at the edges of the cutting parts of the disc milling cutter 9 as described with reference to FIGS. 2 and 3.

FIG. 10 shows an example of the disc milling cutter 9 having the vibration damping structures 6 close to the edges of the cutting parts. As shown in FIG. 10, each of the vibration damping structures 6 is internally located in each of the cutting parts of the disc milling cutter 9 and is positioned most closely to the cutting edge. Therefore, it is possible to locate the vibration damping structures 6 in the cutting parts if rigidity is ensured enough to withstand the cutting force of the disc milling cutter 9.

The size of the vibration clamping structures 6 is limited because each of them, is positioned in a limited area. Hence, the size of the weight 11 is also limited. However, it is possible to make the weight 11 adequately heavy by using tungsten alloy as a material for the weight 11. The tungsten alloy has a density about two times greater than the ferrous metal has. For example, when the disc milling cutter 9 has a diameter of 1200 mm, the weight 11 positioned at the cutting part is about 530 mm away from the rotation axis of the disc milling cutter 9. The columnar weight 11 made of tungsten alloy with a diameter of 50 mm and a thickness of 20 mm has a mass of about 270 g. Then, the columnar weight 11 can secure an adequate mass to damp the vibration of the disc milling cutter 9.

FIG. 11 shows an example of the disc milling cutter 9 having the vibration damping structures 6 on the inner circumference side on the cutter body 8 toward the rotation axis of the disc milling cutter 9 from the cutting parts of the disc milling cutter 9. As shown in FIG. 11, the vibration damping structures 6 are positioned close to the root portions of the cutting edges where the vibration amplitude of the disc milling cutter 9 is slightly smaller than at the cutting edges. However, because the vibration damping structures 6 are separated from the cutting edge, they are less affected by the cutting force of the disc milling cutter 9 and the limitations on their size. When the disc milling cutter 9 has a diameter of 1200 mm, the vibration damping structures 6 are positioned, for example, about 450 mm away from the central axis of the disc milling cutter 9.

FIG. 12 shows an example of the disc milling cutter 9 having the vibration damping structures 6 on the more inner circumference side on the cutter body 8 toward the rotation axis of the disc milling cutter 9 than the vibration damping structures 6 shown in FIG. 11. In this case, when the disc milling cutter 9 has a diameter of 1200 mm, the vibration damping structures 6 are positioned about 340 mm away from the central axis of the disc milling cutter 9. In this configuration compared with the configurations shown in FIGS. 10 and 11, the vibration damping structures 6 are positioned more away from the cutting part of the disc milling cutter 9 where the vibration amplitude is largest, so that the vibration damping structures 6 are less effective. Still, compared with disc milling cutters without the vibration damping structures 6, the vibration of the disc milling cutter 9 shown in FIG. 12 can be damped to some degree.

Figure 13:
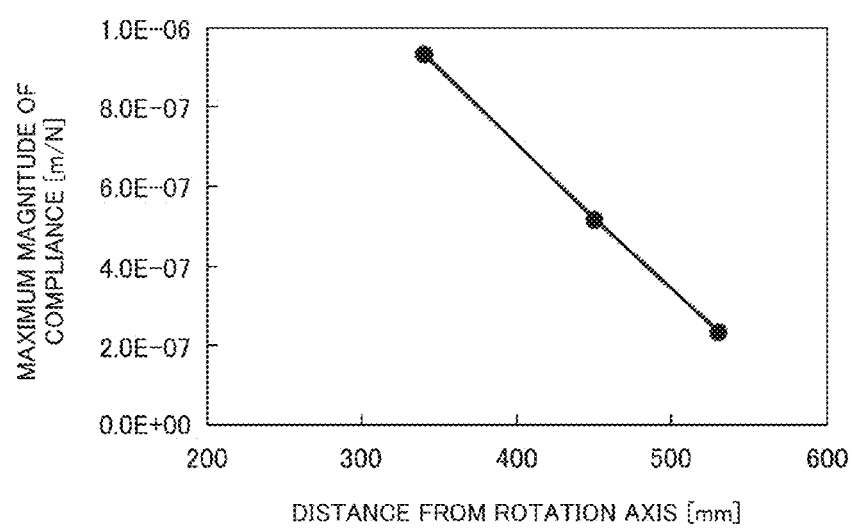
FIG. 13 shows the magnitudes of compliance of the disc milling cutters shown in FIGS. 10 to 12, where the positions of the vibration damping structures in the disc milling cutters are different from each other.

FIG. 13 shows the magnitudes of compliance of the disc milling cutters 9 shown in FIGS. 10 to 12, where the positions of the vibration damping structures 6 in the disc milling cutters 9 are different from each other. The weight 11 included in each of the vibration damping structures 6 has a mass of 100 g. In FIG. 13, the horizontal axis represents the distance (mm) from the rotation axis of the disc milling cutter 9 to the vibration damping structures 6 on the disc milling cutter 9, and the vertical axis represents the maximum magnitude of compliance (m/N) of the disc milling cutter 9. FIG. 13 shows a result that the vibration damping effect is greater as the maximum magnitude of compliance is smaller.

Thus, knowledge is obtained that greater vibration damping effect can be obtained when the vibration damping structures 6 are located closer to the cutting parts.

In the present invention, although the viscoelastic bodies 10A and 10B are used as vibration damping elements, the vibration damping elements to be used are not limited to the viscoelastic bodies 10A and 10B. For example, springs such as disc springs, dash pots, shock absorbers, and other types of dampers may also be used as the vibration damping elements.

The vibration damping structures 6, 6A and 6B in the present embodiments are not necessarily cylindrical as a part or as a whole. As long as they can be placed inside the disc milling cutter 9, they may be partly or wholly in a prismatic shape, such as a cuboid. To prevent rusting of metal parts and to reduce friction between elements in the vibration damping structures 6, 6A, and 6B, the vibration damping structures 6, 6A, and 6B may be filled with liquid, such as oil. Furthermore, the number of the vibration damping structures 6, 6A, or 6B is not necessarily equal to the number of the cutting part included in the disc milling cutter 9. The former number may be larger or smaller than the latter number.

The present invention is applicable not only to disc milling cutters but also to other types of disc-shaped cutters, such as face milling cutters.

The present invention is not limited to the above-described embodiments and it includes various modifications. The foregoing embodiments have been described in detail to make the present invention easily understandable, and the present invention does not necessarily include all the configurations described above. The configuration of any of the foregoing embodiments may be partly replaced by or added to the configuration of another embodiment. Part of the configuration of any of the foregoing embodiments may be removed or may be added to or replaced by another configuration.

LIST OF REFERENCE CHARACTERS

1: disc milling cutter
2: cartridge
3: workpiece
4 groove
5: shaft
6, 6A, 6B: vibration damping structure
7: insert
8: cutter body
9: disc milling cutter with vibration damping structures
10A, 10B: viscoelastic body
11: weight
12: adjusting shim
13: cover
14: screw
15: ring-shaped viscoelastic body
16: vibration damper hole
20: rod
21: linear bushing
25: bolt
30, 31, 32: distance from the rotation axis of the disc milling cutter to the vibration damping structures

What is claimed is:

1. A side milling cutter for slot cutting comprising:
a disc-shaped cutter; and
a plurality of cartridges as cutting edges provided at a predefined interval in a circumferential direction along an outer circumference of the disc-shaped cutter;
wherein the disc-shaped cutter cuts a predefined slot on a workpiece using the cartridges by circumferentially rotating, wherein
the disc-shaped cutter internally includes a plurality of vibration damping structures in the circumferential direction on a disc surface of the disc-shaped cutter,
each of the vibration damping structures includes viscoelastic bodies and a weight between the viscoelastic bodies,
the weight is configured to be able to move in a direction to cancel a vibration mode of the disc-shaped cutter, the vibration mode being a mode in which an outer peripheral portion of the disc-shaped cutter vibrates undulating in an axis direction,
the disc-shaped cutter has a disc-shaped cutter body,
the plurality of cartridges are provided at the predefined interval in the circumferential direction along the outer circumference of the disc-shaped cutter body,
inserts are attached to the plurality of cartridges,
a shaft that is connected to the disc-shaped cutter body on a disc surface of the disc-shaped cutter body, the shaft rotating the disc-shaped cutter body, and
the vibration damping structures are inserted into the disc-shaped cutter body in an area of the disc-shaped cutter body that is most distant from the shaft along a radially outward direction from the shaft,
the disc-shaped cutter includes a disc-shaped cutter body,
each of the vibration damping structures includes a weight; viscoelastic bodies for damping vibration of the cutter, disposed on both surfaces of the weight; a shim for adjusting pressure applied to one of the viscoelastic bodies, disposed on a surface of the one of the viscoelastic bodies; and a cover to hold the shim, the viscoelastic bodies, and the weight in the cutter body,
each of the vibration damping structures is placed in a vibration damper hole formed on an outer or inner circumference side of the cutter body or in a cutting part of the cutter body,
the weight has a groove on a side surface of the weight, and
a ring-shaped viscoelastic body is placed in the groove.

2. The side milling cutter for slot cutting according to claim 1,
wherein each of the vibration damping structures is internally included in a cutting part of the cutter body.

3. The side milling cutter for slot cutting according to claim 1,
wherein each of the vibration damping structures has a through-hole formed at a center of the weight,
wherein each of the vibration damping structures includes a rod and a linear bushing through the through-hole, the rod fixed to the cover and the cutter body,
wherein the rod and the linear bushing are configured to prevent interference between the weight and the cutter body caused by centrifugal force, and
wherein the weight is configured to be able to move in a direction to damp vibration of the cutter body.

4. The side milling cutter for slot cutting according to claim 1,
wherein each of the vibration damping structures has a through-hole formed at a center of the weight and at centers of the viscoelastic bodies,
wherein each of the vibration damping structures includes a bolt or a screw through the through-hole, and
wherein pressure applied to the viscoelastic bodies is adjusted by clamping of the bolt or the screw.

5. The side milling cutter for slot cutting according to claim 1,
wherein each of the vibration damping structures is screwed to the cutter body via the cover.

6. The side milling cutter for slot cutting according to claim 1,
wherein each of the vibration damping structures includes a weight made of ferrous metal or tungsten alloy.

7. A side milling cutter for slot cutting comprising:
a disc-shaped cutter having a disc-shaped cutter body,
a shaft connected to the disc-shaped cutter body on a disc surface of the disc-shaped cutter body, the shaft rotating the disc-shaped cutter body; and
a plurality of cartridges as cutting edges provided at a predefined interval in a circumferential direction along an outer circumference of the disc-shaped cutter, inserts being attached to the plurality of cartridges;
wherein the disc-shaped cutter cuts a predefined slot on a workpiece using the cartridges by circumferentially rotating, wherein
the disc-shaped cutter internally includes a plurality of vibration damping structures in the circumferential direction on a disc surface of the disc-shaped cutter, the vibration damping structures are inserted into the disc-shaped cutter body that is most distant from the shaft along a radially outward direction from the shaft,
each of the vibration damping structures includes viscoelastic bodies for damping vibration of the cutter and a weight between the viscoelastic bodies, the weight is configured to be able to move in a direction to cancel a vibration mode of the disc-shaped cutter, the vibration mode being a mode in which an outer peripheral portion of the disc-shaped cutter vibrates undulating in an axis direction, a shim for adjusting pressure applied to one of the viscoelastic bodies is disposed on a surface of one of the viscoelastic bodies; and a cover holds the shim, the viscoelastic bodies and the weight in the cutter body, a through-hole is formed at a center of the weight, a rod and a linear bushing pass through the through-hole, the rod being fixed to the cover and the cutter body, the rod and the linear bushing are configured to prevent interference between the weight and the cutter body caused by centrifugal force.

* * * * *